United States Patent [19]

Sides et al.

[11] Patent Number: 5,589,141
[45] Date of Patent: Dec. 31, 1996

[54] USE OF MIXED GASES IN HYBRID AIR BAG INFLATORS

[75] Inventors: James R. Sides; James D. Martin; Robert S. Scheffee, all of Gainesville, Va.

[73] Assignee: Atlantic Research Corporation, Vienna, Va.

[21] Appl. No.: 492,955

[22] Filed: Jul. 28, 1995

Related U.S. Application Data

[63] Continuation-in-part of Ser. No. 414,565, Mar. 31, 1995, abandoned.

[51] Int. Cl.[6] .................................................. B60R 21/26
[52] U.S. Cl. ........................... 422/164; 280/741; 422/165; 422/305
[58] Field of Search ............................... 422/164, 165, 422/305; 280/728 R, 736, 741

[56] References Cited

U.S. PATENT DOCUMENTS

| | | |
|---|---|---|
| Re. 29,228 | 5/1977 | Hass ........................................ 280/738 |
| 4,798,142 | 1/1989 | Canterberry et al. .................... 102/290 |
| 4,878,690 | 11/1989 | Cunningham ........................... 280/741 |
| 4,909,549 | 3/1990 | Poole et al. ............................. 280/738 |
| 5,125,684 | 6/1992 | Cartwright ............................... 280/736 |
| 5,184,846 | 2/1993 | Goetz ...................................... 280/736 |
| 5,199,740 | 4/1993 | Frantom et al. ......................... 280/736 |
| 5,324,075 | 6/1994 | Sampson ................................. 280/736 |
| 5,348,344 | 9/1994 | Blumenthal et al. .................... 280/737 |
| 5,360,232 | 11/1994 | Lowe et al. .............................. 280/741 |
| 5,368,329 | 11/1994 | Hock ........................................ 280/741 |
| 5,431,103 | 7/1995 | Hock et al. .............................. 102/287 |
| 5,451,277 | 9/1995 | Katzakian et al. ...................... 149/19.92 |

*Primary Examiner*—Robert J. Warden
*Assistant Examiner*—Robert Carpenter
*Attorney, Agent, or Firm*—Lowe, Price, LeBlanc & Becker

[57] ABSTRACT

Particulate-free non-toxic gases are generated in a hybrid generator device by conducting the ignition of the propellant with an effective oxidizer, using a mixture of a molecular oxygen-containing gas and argon by varying the ratio of said gas to argon to provide only non-toxic reaction products in the exhaust gas.

28 Claims, 1 Drawing Sheet

PASSENGER SIDE INFLATOR

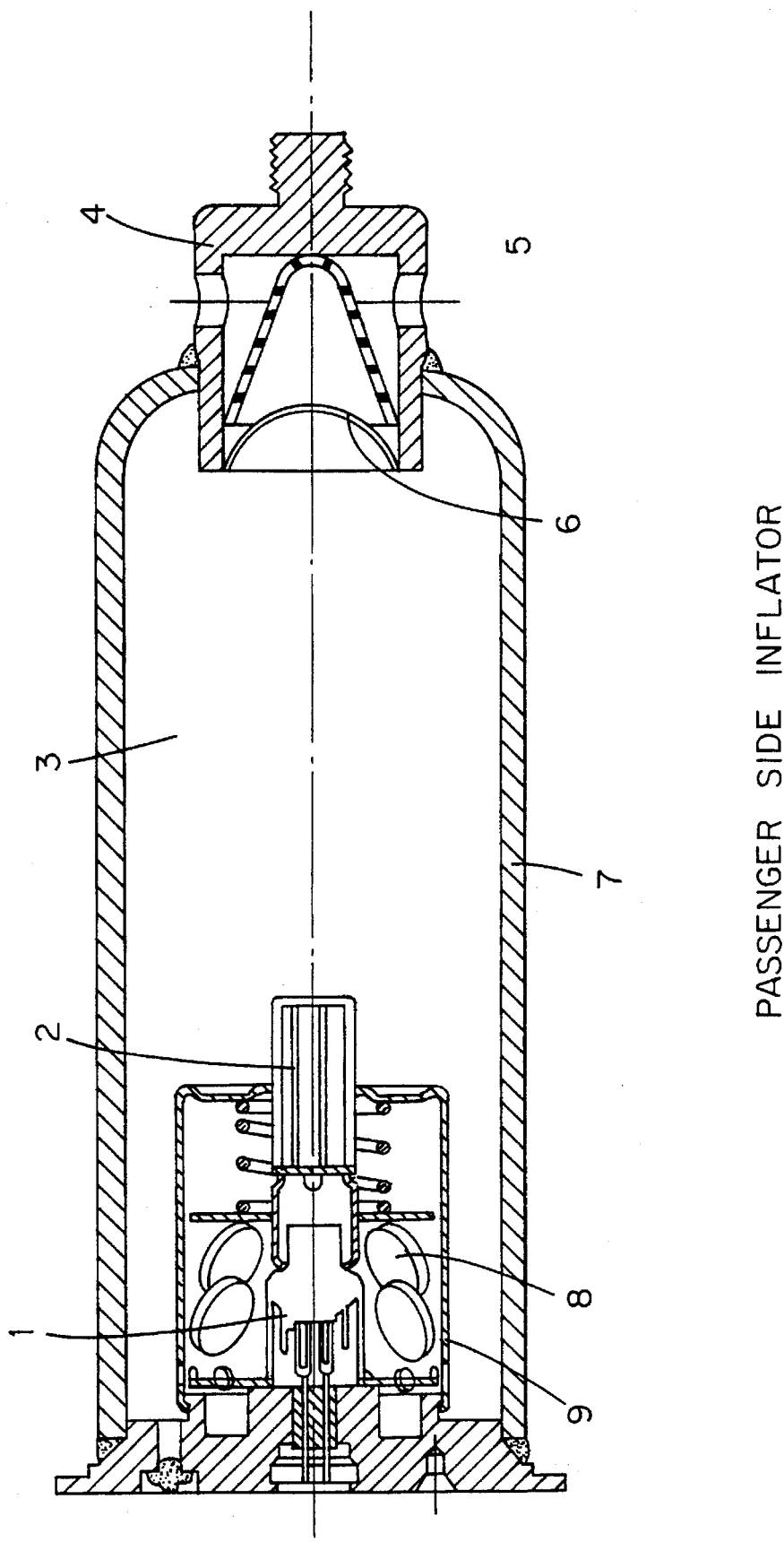
PASSENGER SIDE INFLATOR

USE OF MIXED GASES IN HYBRID AIR BAG INFLATORS

This application is a continuation in part of application Ser. No. 08/414,565 filed Mar. 31, 1995, now abandoned.

FIELD OF THE INVENTION

The present invention relates generally to a method of generating non-toxic gases without particulates and to an improvement in a hybrid inflator for producing said non-toxic gases and, especially for use in generating the gases for a vehicle occupant restraint.

The art is replete with types of inflators for inflating an air bag employed in an inflatable restraint system. Among the types of inflators is one that utilizes a quantity of stored compressed gas which is selectively released to inflate the air bag. A related type generates a gas source from a combustible gas-generating material which, upon ignition, provides a quantity of gas sufficient to inflate the air bag. In still another type, the air bag inflating gas is provided by the combination of a stored compressed gas and the combustion products of the gas generating material. The latter type is known as a hybrid inflator.

In the past, hybrid inflators have been subject to certain disadvantages. The burning of the propellant and the initiation materials in such inflators resulted in the production of undesired particulate matter. The employment of particulate-containing inflator emissions to inflate an air bag might result in the particulates being passed into the vehicle and inhaled by the occupants thereof.

Aside from the gas borne particulate material being inhaled by the passengers in the vehicle, such particulates, if dispersed and airborne, might give the appearance of smoke and cause undue concern that a fire would be present.

As is well known in this field, air or other gas and solid gas generating material are stored in a container. If there is a high rate of vehicle deceleration, indicative of a collision, the gas in the container is released to inflate a vehicle occupant restraint, i.e., an air bag, which restrains and protects the occupant of the vehicle from serious injury. Upon the occurrence of a high rate vehicle deceleration, such as occurs in a vehicle collision, the gas generating material is ignited. As said gas generating material burns, it forms hot expanded gases or vapors which heat and mix with the stored gas, and the heated mixture of gases rushes into the air bag.

DESCRIPTION OF THE PRIOR ART

The present invention involves the use of mixtures of oxygen or air with argon, or the like, to permit one to control the oxidation level of the total propellant. Fuel rich solid propellant formulations may be varied and the amounts of oxygen to argon also varied so that the exhaust products of said fuel rich formulation give nontoxic products, exemplified by carbon dioxide, water vapor and nitrogen.

Hybrid inflators have generally used a solid propellant to heat argon gas to inflate an air bag. One of the problems with hybrids has been the amount of particulates from the KC1O4 oxidizer used in the propellant. Particulates can be eliminated through the use of propellant compounds such as 5-aminotetrazole (5-AT), aminoguanidine nitrate (AGN) or mixtures thereof. Also, as the oxidizer, ammonium nitrate may be substituted for the $KClO_4$.

The above concept is not taught in the prior art. In U.S. Pat. No. 4,909,549, at column 3, beginning at line 48, the inventors describe the use of gases comprising a primary gas mixture diluted with a secondary gas mixture (air) that provides several advantages. The benefits enumerated include cooling the primary gas mixture by dilution, thus avoiding the potential for burning the occupants of an aircraft or automobile in which the crash bag is utilized. The air dilution of the primary gas mixture reduces the level of toxic species present to much lower, acceptable levels. Thus, the employment of tetrazole or triazole compounds containing hydrogen in the molecule is practical, since the concentration of hydrogen in the gas produced can generally be reduced by oxidation to very low levels. Nevertheless, the reference does not disclose or suggest controlling the ratio of argon to oxygen as taught by the present inventors.

In U.S. Pat. No. 5,199,740, at column 5, hot potassium chloride, as well as other constituents in the heated gases produced by the burning of the propellant, is described as entering the pressure vessel and impinging upon the inside wall of the vessel part. As the heated products of combustion enter the pressure vessel, the temperature of the pressurized argon gas will increase rather uniformly. When the temperature of the argon gas rises, its pressure will increase to a level which will cause the rupture of the outlet burst disc disposed in a step bore, thereby permitting the gases to flow through the exit openings in the manifold. Clearly, the foregoing is alien to the concept of the present invention where the addition of varied amounts of oxygen to argon enables the exhaust products of fuel rich formulations to be controlled to give non-toxic products. Such addition further permits the use of higher gas mixture temperatures to be attained than are produced with a propellant and air, because of the low heat capacity of argon and some unidentified unique property of this gas. Therefore, at a given gas mixture temperature, less argon and oxygen are needed, resulting in the capability of employing a reduced system size without compromising the system's effectiveness.

In U.S. Pat. No. 5,348,344, the specification, at column 1, beginning at line 48, discloses the provision of an inert gas, preferably nitrogen or argon (column 3) or a mixture thereof, with a fuel gas which is preferably hydrogen and/or methane, but may be any other flammable gas. The oxidizer gas is preferably oxygen. In one embodiment of the invention, the containing means is a single container for holding the inert gas, the fuel gas and the oxidizer gas as a mixture of gases. In another embodiment, a first container holds the fuel gas, a second confines an excess of the oxidizer gas and the containing means defines a combustion chamber in which the fuel gas and oxidizer gas are received and in which the mixture of gases is ignited.

By the above method, the rate of inflation of and the pressure in the inflatable device can be controlled by selecting the amount of fuel gas and oxidizer gas to yield a desired burning rate which in turn fixes the predetermined volumetric rate of flow of warm gas into the inflatable device. Additionally, the rate of inflation can be controlled by flow control orifices or the like through which the gas flows into the inflatable device. It is apparent that the reference does not evince an appreciation for the criticality of the argon's presence and, thus, describes a device and method materially different from those concerned with the invention herein.

In U.S. Pat. No. 29,228, at column 2, beginning at line 35, the inventor describes an embodiment wherein the confinement is inflated under the influence of a high velocity source of fluid, said fluid being a gas generator of the solid-propellant rocket motor type. The gas generator provides a high velocity stream of hot gas which cooperates with a nozzle to draw the large volume of air into confinement. The hot gas is cooled by the large volume of air so that the container is not heated to excessive temperatures. Not only does the reference not disclose the use of argon, but the concept taught in the specification would not have led one skilled in the art to the presently claimed invention.

The attributes of smokeless air bag propellants are listed below:

ATTRIBUTES OF SMOKELESS AIR BAG PROPELLANTS

- Smokeless propellants generate only gaseous combustion products such as $CO_2$, $H_2O$, $N_2$, and noble gases (e.g., Ar). Thus, they are limited to the chemical elements C, H, O, N, and noble gases (He, Ar)
- Alkali metal fuels (e.g., $NAN_3$) and oxidizers (e.g., $KClO_4$) and alkaline earth oxidizers [e.g., Sr $(NO_3)_2$] generate particulates (e.g., $Na_2O$, KCl, and SrO). Thus, they cannot be used in smokeless propellants
- Gun propellants based on nitrocellulose are excellent smokeless propellants but cannot be used in air bags because of the storage temperature requirement.
- Smokeless propellants containing nitramines, such as RDX and HMX, can withstand high temperature storage and, thus, meet this requirement to be a candidate of or an air bag propellant for use with selective oxygen/argon formulations
- Smokeless propellants containing ammonium nitrate can withstand high temperature storage but not temperature cycling through 50° C. They are precluded because the lower storage temperature is −40° C.
- However, smokeless propellants containing ammonium nitrate eutectics have been found to withstand temperature cycling
- These propellants must be carefully formulated to prevent formation of toxic combustion products (i.e., HCN and $NO_x$)

To describe required and desired characteristics of smokeless hybrid air bag propellants, the following tabulation is provided:

CHARACTERISTICS OF SMOKELESS HYBRID AIR BAG PROPELLANTS

| CHAR-ACTERISTICS | REQUIRED | DESIRED |
| --- | --- | --- |
| Particulates | <1.0 gram | Zero |
| Producibility | Cast, extrude, injection mold, or press | Extrude, injection mold, or cast |
| Stability | 95° C. | 107° C. |
| Sensitivity | Insensitive | Insensitive |
| Combustion | Complete burn | Complete |
| Toxicity | Nontoxic | Nontoxic |
| Exhaust | None | No smell |
| Gas | Hybrid (argon, air, or $O_2$-argon | Argon |

BRIEF DESCRIPTION OF THE DRAWING

The Figure is a schematic illustration of an air bag inflator useful in the present invention.

DETAILED DESCRIPTION OF THE INVENTION AND THE PREFERRED EMBODIMENT

The invention of interest relates to an improvement in inflator technology and provides clean odorless gas without particulates or toxic species for inflating devices such as air bags and the like. In the interest of completeness, a conventional inflator mechanism is depicted in the figure of the drawing. The inflator structure is evident from the labeled diagram.

In the figure depicting a conventional passenger side inflator, the initiator 1. ignites in response to a sensor (not shown) that senses rapid deceleration indicative of a collision. The initiator gives off hot gas that ignites the ignition charge 2. which causes the main generant charge 9. to combust, generating the inflation gas mixture 3. When the pressure in said gas mixture increases to a certain point, the seal disc 6. ruptures permitting the gas mixture to exit the manifold 4. through the outlet ports 5. and inflate an air bag. The generant container 9. holds the main generant charge 8. All the charges and the inflation gas mixture are enclosed in the pressure tank 7.

The following examples demonstrate the efficacy of the disclosed invention. Examples 1–3 disclose certain aspects of the inventors' method. Although Example 4 lacks some of the data provided with the other examples, the example is included in this disclosure to permit a comparison to be made between the presence of toxic products obtained when argon, instead of air, is the hybrid gas in the reactor.

EXAMPLE 1

Composition: AGN/polycarbonate binder

| | |
| --- | --- |
| Particulates | 0–0.2 g |
| Producibility | pressed |
| Stability | OK - 107° C. |
| Sensitivity | Insensitive |
| Combustion | Complete |
| Toxicity | Non-toxic |
| Hybrid gas | Argon/$O_2$ or Air |
| Igniter | Smokeless |

EXAMPLE 2

Composition: 84.8%/wt HMX with 15.2% HTPB (Arcadene®) as binder

| | |
| --- | --- |
| Particulates | 0–0.2 g |
| Producibility | Cast or injection molded |
| Stability | OK - 107° C. |
| Sensitivity | Insensitive to ESD and friction |
| Burn rate | |
| Combustion | Complete |
| Toxicity | Non-toxic |
| Hybrid gas | $O_2$/Argon |
| Igniter | Smokey |

EXAMPLE 3

Composition: HTPB/Nitramine

| | |
| --- | --- |
| Particulates | 0.2 g |
| Producibility | Cast or injection molded |
| Stability | OK at 107° C. |
| Sensitivity | Insensitive |
| Burn rate | 0.15 ips at 1000 psi |
| Combustion | Complete |
| Toxicity | Non-toxic |
| Hybrid gas | $O_2$/Argon |
| Igniter | B/$KNO_3$ |

In the compositions of Examples 2 and 3, a compound, such as isophorone diisocyanate (IPDI), may be included as a curing agent for the hydroxy-terminated butadiene binder.

EXAMPLE 4

Composition: HMX or RDX (nitramine)/HTPB

| Toxicity | Exhaust products include toxic amounts of $No_x$, $NO_2$ and $NH_3$ |
| --- | --- |
| Hybrid gas | Air |

The instant method of generating non-toxic gases without particulates comprises conducting the ignition of the propellant in the presence of an ammonium nitrate oxidizer and using a suitable propellant, e.g., aminoguanidine nitrate or a nitramine, such as RDX and/or HMX[1]. In the presence of argon and a molecular oxygen-containing gas, but with a controlled ratio of the molecular oxygen-containing gas to argon to minimize toxic values, the non-toxic reaction products in the exhaust gas include carbon dioxide, $H_2O$, $N_2$ and mixtures thereof. By using selected mixtures of RDX is 1,3,5-trimitro-1,3,5-triazacyclohexane or cyclotrimethylenenitramine; and

[1] RDX is 1,3,5-trinitro-1,3,5-triazocyclohexane or cyclotrimethylenenitramine; and
HMX is 1,3,5,7-tetranitro-1,3,5,7-tetraazacyclooctane or cyclotetramethylenetetranitramine molecular oxygen-containing gas with argon, one is able to control the oxidation level of the total propellant so that it falls into a desired range.

Another aspect of the present invention involves the use of a binder with the described propellant.

While a polycarbonate binder may be used with the aminoguanidine nitrate (AGN) propellant in the form of a pressed pellet charge, a polyvinyl alcohol (PVA) binder is likewise very effective. The binder will comprise about 5% by weight of the propellant.

The ignition of the propellant takes place in the presence of controlled ratios of argon to oxygen. For example, 21 parts by volume of oxygen are employed with 79 parts by volume of argon. However, depending upon all other conditions, 15 to 30 parts by volume of oxygen might be used with complementary volumes of argon.

By employing a mixture of oxygen with argon and a smokeless propellant, such as 95% aminoguanidine nitrate and 5% of a polycarbonate binder in a pressed pellet charge, the advantage is realized of having the charge non-hygroscopic. However, a particularly preferred formulation involves about 95% by weight aminoguanidine nitrate with about 5% by weight polyvinyl alcohol used with 20% oxygen and 80% argon.

The method of the present invention is well suited for inflating automotive vehicle air bags, used as occupant restraints when a vehicle decelerates rapidly, such as in a collision.

By utilizing means for varying the ratios of molecular oxygen-containing gas to argon, particulates and toxic amounts of nitrogen oxides, ammonia and nitric acid in the exhaust are minimized or at least placed in an acceptable range. Additionally, a smaller size inflator device may be used than would otherwise be required. This is due to the higher gas mixture temperature achievable by the low heat capacity of argon, permitting the use of reduced amounts of argon and oxygen and thus smaller equipment.

The invention has been described specifically with reference to the particular embodiments disclosed. However, it should be understood that the scope of the invention is broader and is properly defined by the following claims.

What is claimed is:

1. A method of generating non-toxic gases without particulates comprising conducting an ignition of a propellant composition with an effective oxidizer, using a suitable propellant comprising aminoguanidine nitrate, in conjunction with a suitable binder, in the presence of argon and a molecular oxygen-containing gas, and selectively providing a ratio of said molecular oxygen-containing gas to argon prior to ignition to provide non-toxic reaction products in the exhaust gas.

2. The method of claim 1 wherein the non-toxic reaction products in the exhaust gas are selected from the group consisting of $CO_2$, $H_2O$, $N_2$ and mixtures thereof.

3. The method of claim 1 wherein the selected mixture of molecular oxygen-containing gas with argon enables the oxidation level of the propellant composition to be controlled and fall into a desired range.

4. The method of claim 1 wherein the binder is selected from the group consisting of HTPB, polyvinyl alcohol and a polycarbonate.

5. The method of claim 4 wherein the propellant composition comprises about 95% by weight aminoguanidine nitrate and the charge is non-hygroscopic.

6. The method of claim 5 wherein the generated gases are used to inflate an automotive vehicle air bag.

7. The method of claim 1 wherein the propellant comprises a nitramine selected from RDX, HMX and mixtures thereof.

8. The method of claim 1 wherein the binder is polycarbonate and the propellant composition is in the form of a pressed pellet charge.

9. The method of claim 8 wherein the binder comprises about 5% by weight of the propellant.

10. The method of claim 9 wherein the ignition environment comprises about 21 parts by volume of oxygen and about 79 parts by volume of argon.

11. The method of claim 9 wherein the ignition environment comprises about 15 to about 30 parts by volume of oxygen with a complementary volume of argon.

12. The method of claim 1 wherein the binder is HTPB and the propellant composition is in the form of a cast, injection molded or extruded mass.

13. The method of claim 1 wherein the generated gases are used to inflate an automotive vehicle air bag.

14. The method of claim 1 wherein the binder is polyvinyl alcohol.

15. The method of claim 1 wherein the propellant composition comprises about 95% by weight aminoguanidine nitrate and about 5% by weight polyvinyl alcohol as binder, said composition being ignited in the presence of 20% oxygen and 80% argon.

16. In a method for generating gas to fill an automotive vehicle air bag utilizing a combination of air and argon as the environment in which compounds constituting the primary source of gas are burned to generate said gas to inflate said air bag, the improvement comprising utilizing a propellent composition comprising aminoguanidine nitrate, in conjunction with a suitable binder, as said primary source; and employing during ignition, ratios of air to argon whereby particulates and toxic amounts of nitrogen oxides, ammonia, HCN, and nitric acid in the exhaust are minimized.

17. The improvement of claim 16 wherein the non-toxic products in the exhaust gas are selected from the group consisting of $CO_2$, $H_2O$, $N_2$ and mixtures thereof.

18. The improvement of claim 16 wherein the propellant composition is used with a binder of hydroxy-terminated polybutadiene.

19. The improvement of claim 16 wherein the binder is a polycarbonate.

20. The improvement of claim 16 wherein the propellant composition includes a polycarbonate binder.

21. The improvement of claim 20 wherein the propellant composition includes 5% by weight polycarbonate binder.

22. The improvement of claim 21 wherein the propellant composition includes aminoguanidine nitrate and the propellant composition and binder are in the form of a pressed pellet charge.

23. The improvement of claim 22 wherein the binder is polyvinyl alcohol.

24. The improvement of claim 23, wherein the polyvinyl alcohol binder is present in the amount of 5% by weight of the propellant composition.

25. The improvement of claim 18 wherein a curing agent is included with the binder.

26. The improvement of claim 25, wherein the curing agent is IPDI.

27. The improvement of claim 16 wherein the compound constituting the primary source of gas is AGN and a polyvinyl alcohol is used as binder.

28. The improvement of claim 27 wherein the polyvinyl alcohol is present in an amount of 5% by weight.

* * * * *